(12) United States Patent
Wang et al.

(10) Patent No.: US 9,176,286 B2
(45) Date of Patent: Nov. 3, 2015

(54) OPTICAL FIBER PLUG FOR HIGH DENSITY OPTICAL FIBER CONNECTIONS

(75) Inventors: Qiyue Wang, Shenzhen (CN); Zhigang Xia, Shenzhen (CN)

(73) Assignee: SUNSEA TELECOMMUNICATIONS CO., LTD., Shenzhen, Guangdong (CN)

( * ) Notice: Subject to any disclaimer, the term of this patent is extended or adjusted under 35 U.S.C. 154(b) by 54 days.

(21) Appl. No.: 13/696,719

(22) PCT Filed: Jun. 25, 2010

(86) PCT No.: PCT/CN2010/074534
§ 371 (c)(1),
(2), (4) Date: Apr. 4, 2013

(87) PCT Pub. No.: WO2011/160310
PCT Pub. Date: Dec. 29, 2011

(65) Prior Publication Data
US 2013/0202252 A1 Aug. 8, 2013

(51) Int. Cl.
*G02B 6/36* (2006.01)
*G02B 6/38* (2006.01)

(52) U.S. Cl.
CPC .............. *G02B 6/389* (2013.01); *G02B 6/3893* (2013.01); *G02B 6/3897* (2013.01); *G02B 6/3898* (2013.01)

(58) Field of Classification Search
CPC .... G02B 6/3897; G02B 6/3869; G02B 6/387; G02B 6/389; H01R 13/6375; H01R 13/6378
USPC ............ 385/53, 66, 70, 76, 78, 81, 84, 88, 92
See application file for complete search history.

(56) References Cited

U.S. PATENT DOCUMENTS

| 5,082,455 | A | * | 1/1992 | Wei ................................ 439/352 |
| 8,506,172 | B2 | * | 8/2013 | Meadowcroft et al. .......... 385/53 |
| 2003/0002816 | A1 | * | 1/2003 | De Marchi ........................ 385/78 |
| 2010/0008629 | A1 | * | 1/2010 | Fantini et al. ..................... 385/76 |

FOREIGN PATENT DOCUMENTS

| CN | 1 315 007 | 9/2001 |
| CN | 2 475 040 | 1/2002 |
| CN | 2 804 886 | 8/2006 |
| EP | 0 942 495 | 9/1999 |
| EP | 1 180 701 | 2/2002 |
| JP | 2010 098 787 | 4/2010 |

* cited by examiner

*Primary Examiner* — Kaveh Kianni
*Assistant Examiner* — Hung Lam
(74) *Attorney, Agent, or Firm* — Fay Kaplun & Marcin, LLP

(57) ABSTRACT

An optical fiber plug for high density optical fiber connections is proposed for matching with an optical fiber adapter, and includes a body with an elastic buckling member (130) to buckle the adapter, and an ejecting assembly actuated at the same time when the buckling member (130) is actuated to release the body from the adapter. The ejecting assembly includes an ejecting spring (420) and an ejecting rod (410) arranged in the body. The ejecting rod (410) is ejected from the body when the ejecting assembly is actuated, and stopped on the adapter to eject the body out of the adapter. The optical fiber plug can be automatically ejected out of the adapter when the buckling member (130) of the plug is actuated, thus solving the problem of operational difficulties caused by reducing the geometric size of the plug, and realizing high density optical fiber connections with optical fiber jumpers.

17 Claims, 4 Drawing Sheets

OPTICAL FIBER PLUG FOR HIGH DENSITY OPTICAL FIBER CONNECTIONS

TECHNICAL FIELD

The present application relates to physical connection technologies in the optical communication field, and particularly to an optical fiber plug for high density optical fiber connections.

TECHNICAL BACKGROUND

The capability of information interconnection is remarkably increased by the Internet and wireless technologies, which experienced an exponential growth across the globe and are expected to support the data traffic generated by hundreds of millions of users. The global transmission of billions of digital data is achieved by switches, long-distance optical fibers, Metropolitan Area Networks, and other various access technologies. The connections between optical fibers and those between optical fibers and equipments are achieved by connectors. As the information interconnection grows explosively, the density of the optical fiber connections is required to be improved continuously, that is, more optical fiber connections per unit volume should be achieved.

Due to the small diameter of the optical fiber, even of the optical fiber coated with a protection layer, hundreds of optical fibers can be placed into an optical cable with a relatively small cross section. However, these optical fibers would cause the space occupied at the side of a connector to be increased by 20 to 50 or more times. Because the optical fiber connector should has a size large enough for holding by fingers, and sufficiently stable optical coupling and holding devices also occupy some space, a typical manner for increasing the connection density is to combine many optical fibers into a pin. However, such a manner is not suitable for the situation where an optical fiber jumper is required, especially in the application approaching the user terminal. In those situations of high density optical fiber connections in which the optical fiber jumper is needed, if the high density optical fiber connections are implemented merely by reducing the geometrical size of the optical fiber plug of the optical fiber connector, a significant operation difficulty will occur, and the neighboring optical fiber plug can be affected susceptibly. For example, during the pulling of an optical fiber plug, the optical fiber plug is difficult for operating due to its small size, and on the other hand, other neighboring optical fiber plugs are susceptible to improper touching and hence loosening.

SUMMARY OF THE INVENTION

The technical problem to be solved by the present invention is to provide an optical fiber plug applicable to achieve high density optical fiber connections, in view of the defect that the optical fiber plug in the prior art cannot satisfy the demands for the high density optical fiber connections.

The technical solution adopted by the present invention to solve the technical problem includes: constructing an optical fiber plug for high density optical fiber connections that is used for matching with an optical fiber adapter, where the optical fiber plug includes a body which is provided with an elastic buckling member adapted to buckle the optical fiber adapter, the body is also provided with an ejecting assembly which is actuated at the same time when the elastic buckling member is actuated to release the body from the optical fiber adapter, the ejecting assembly includes an ejecting spring and an ejecting rod that are arranged in the body, and the ejecting rod is ejected out of the body when the ejecting assembly is actuated, and is stopped on the optical fiber adapter to eject the body out of the optical fiber adapter.

In the optical fiber plug for high density optical fiber connections of the present invention, the body includes a base and a tailstock connected in the rear end of the base, the base contains a first cavity and a second cavity extending in parallel in its longitudinal direction, a first through-hole and a second through-hole respectively facing the first cavity and the second cavity are provided in the front end side of the base, the first cavity contains a core receiving assembly, a core receiver of which protrudes from the first through-hole, the second cavity contains the ejecting assembly, and the ejecting rod is ejected from the second through-hole when the ejecting assembly is actuated.

In the optical fiber plug for high density optical fiber connections of the present invention, the elastic buckling member is located above the second cavity and includes two elastic cantilevers arranged in parallel, ends of which have protrusions with slopes, the ejecting assembly further includes a control rod connected integrally with the ejecting rod, the control rod may be located between the two elastic cantilevers and have a lateral rod perpendicular to its longitudinal direction and adapted to press on the elastic cantilevers, and when the control rod is pressed down, the elastic cantilevers are pressed down so that the elastic buckling member is released from the optical fiber adapter.

In the optical fiber plug for high density optical fiber connections of the present invention, one end of the ejecting spring abuts against the tailstock, the other end thereof abuts against the ejecting rod, a latch member is provided on the ejecting rod, and a barrier member and a positioning slide slot in front of the barrier member are arranged in the top wall of the second cavity; the latch member may be stuck by the barrier member, the ejecting spring is compressed between the ejecting rod and the tailstock. When the control rod is pressed, the ejecting rod is moved downward to release the latch member from the barrier member, so that the ejecting rod is ejected forward under the effect of the ejecting spring, and the latch member slides into the positioning slide slot.

In the optical fiber plug for high density optical fiber connections of the present invention, the side of the latch member that is opposite to the barrier member sticking the latch member forms a slope.

In the optical fiber plug for high density optical fiber connections of the present invention, the core receiving assembly includes a core receiver adjusting spring located between the core receiver and the tailstock, and the core receiver adjusting spring is arranged around the optical fiber introduced to the core receiver.

In the optical fiber plug for high density optical fiber connections of the present invention, the tailstock which is provided with a buckle buckles the base which is provided with a buckling position matching with the buckle.

In the optical fiber plug for high density optical fiber connections of the present invention, the tailstock is provided with an extending section extending forward from the fore-end of the tailstock, and a spring retainer for matching with the core receiver adjusting spring is arranged in the fore-end of the extending section.

Beneficial effects achieved by implementing the optical fiber plug for high density optical fiber connections of the invention include that: the optical fiber plug of the present invention can be automatically ejected out of the optical fiber adapter when the elastic buckling member of the plug is actuated, thus solving the problem of operational difficulties caused by the reduced geometrical size of the optical fiber plug, and realizing high density optical fiber connections with optical fiber jumpers.

BRIEF DESCRIPTION OF THE DRAWINGS

The present invention is now further described below with reference to the drawings and embodiments, in which.

DETAILED DESCRIPTION OF PREFERRED EMBODIMENTS

In order to further understand the technical features, objects and effects of the present invention clearly, the detailed embodiments of the present invention are described in details with reference to the drawings.

The inventive optical fiber plug for high density optical fiber connections is proposed to resolve the problem of the difficult operation due to the geometrical size of the optical fiber plug which is reduced for achieving the high density optical fiber connections with optical fiber jumpers. In order to resolve this problem, the technical solution of the present invention includes that: the body of the optical fiber plug is provided with an elastic buckling member adapted to buckle the optical fiber adapter, and is further provided with an ejecting assembly which is actuated at the same time when the elastic buckling member is actuated to release the body from the optical fiber adapter, where the ejecting assembly includes an ejecting spring and an ejecting rod that are arranged in the body, and the ejecting rod may be ejected out of the body when the ejecting assembly is actuated and may be stopped on the optical fiber adapter so as to eject the body out of the optical fiber adapter. As such, even if the geometrical size of the optical fiber plug is reduced, the optical fiber plug can be ejected out by actuating the elastic buckling member of the body with hands or tools (such as a screw driver or the like), achieving a very convenient operation.

Figure 1:
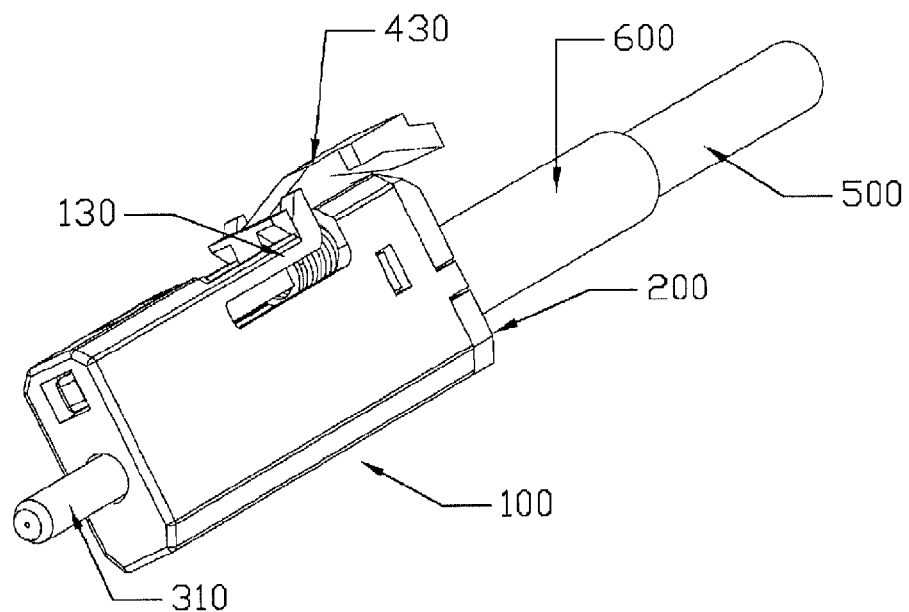
FIG. 1 is a perspective schematic diagram of an optical fiber plug according to a first embodiment of the invention.
Figure 2:
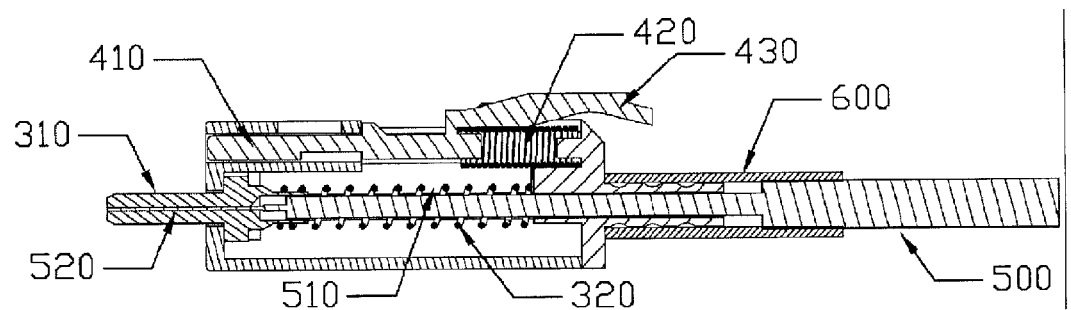
FIG. 2 is a sectional diagram of the optical fiber plug according to the first embodiment of the invention.
Figure 3:
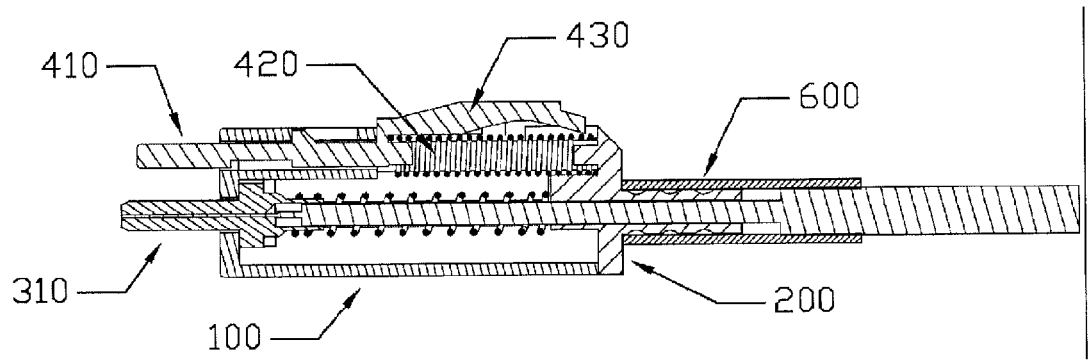
FIG. 3 is a schematic diagram showing the optical fiber plug with the ejected ejecting rod according to the first embodiment of the invention.

As shown in FIGS. 1, 2 and 3, the optical fiber plug according to the first embodiment of the present invention includes a body, which includes a base 100 and a tailstock 200 connected to the rear end of the base 100. The base 100 contains a first cavity 110 and a second cavity 120 extending in parallel in the longitudinal direction of the base 100, and a first through-hole 111 and a second through-hole 121 respectively facing the first cavity 110 and the second cavity 120 are provided in the front end side of the base 100. The first cavity 110 receives a core receiving assembly, a core receiver 310 of which protrudes through the first through-hole, and the second cavity 120 receives an ejecting assembly comprising an ejecting rod 410 and an ejecting spring 420, with the ejecting rod 410 being ejected through the second through-hole 121 when the ejecting assembly is actuated. An optical cable 500 may be introduced into the base 100 from the tailstock 200, and an optical fiber 510 exposed after the outer sheath is stripped off is introduced to the core receiver 310, with a naked fiber 520 being inserted into the core receiver 310. In order to enable adaptive adjustment of the state of the core receiver 310, the core receiving assembly also includes a core receiver adjusting spring 320 which is located between the core receiver 310 and the tailstock 200, and the core receiver adjusting spring 320 is arranged around the optical fiber 510 introduced to the core receiver 310.

Figure 4:
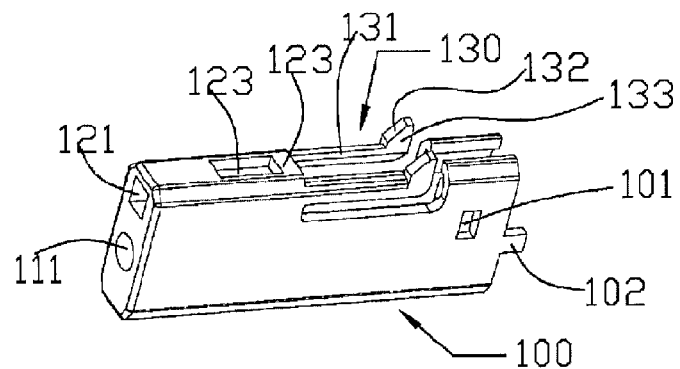
FIG. 4 is a schematic diagram showing the base of the optical fiber plug according to the first embodiment of the invention.
Figure 5:
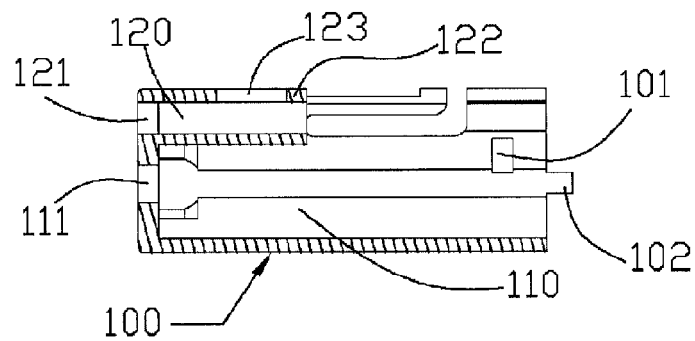
FIG. 5 is a sectional diagram showing the base of the optical fiber plug according to the first embodiment of the invention.
Figure 6:
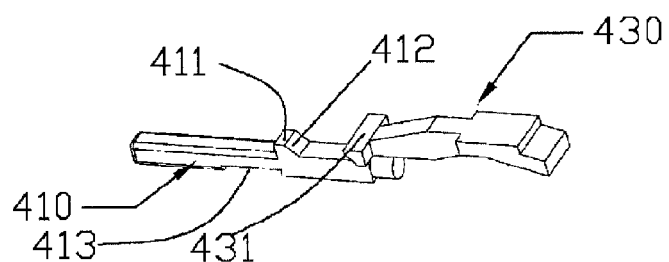
FIG. 6 is a schematic diagram showing the ejecting rod and the control rod of the optical fiber plug according to the first embodiment of the invention.

Referring to FIGS. 4, 5 and 6, the base of the body of the optical fiber plug is provided with an elastic buckling member 130, which is located above the second cavity 120 and includes two elastic cantilevers 131 arranged in parallel, ends of which are provided with protrusions 133 with slopes 132. The ejecting assembly further includes a control rod 430 connected integrally with the ejecting rod 410. The control rod 430 may be located between those two elastic cantilevers 131 and include a lateral rod 431 perpendicular to the longitudinal direction of the control rod 430, and the lateral rod 431 may press on the elastic cantilevers 131. When the control rod 430 is pressed down, the elastic cantilevers 131 are pressed down so that the elastic buckling member 130 is released from the optical fiber adapter.

One end of the ejecting spring 420 of the ejecting assembly abuts against the tailstock 200, and the other end thereof abuts against the ejecting rod 410. In particular, one end of the ejecting spring 420 is arranged around the protrusive pillar 210 of the tailstock 200, the other end thereof is arranged around the ejecting rod 410, and the ejecting spring 420 is stopped by the control rod 430. In practice, a stopping step may be arranged on the ejecting rod 410 for stopping the ejecting spring. A latch member 411 is arranged on the ejecting rod 410, and a barrier member 122 and a positioning slide slot 123 in front of the barrier member 122 are arranged in the top wall of the second cavity 120. The latch member 411 may be pressed against the barrier member 122, and the ejecting spring 420 is compressed between the ejecting rod 410 and the tailstock 200. When the control rod 430 is pressed, the ejecting rod 410 moves downward to release the latch member 411 from the barrier member 122, so that the ejecting rod 410 is ejected forward under the effect of the ejecting spring 420, and the latch member 411 slides into the positioning slide slot 123. In order to facilitate the return of the ejecting rod 410, a side of the latch member 411 that is opposite to the barrier member 122 sticking the latch member forms a slope 412. For facilitating the downward movement of the ejecting rod 410, a groove 413 is arranged in the bottom side of the ejecting rod 410.

Figure 7:
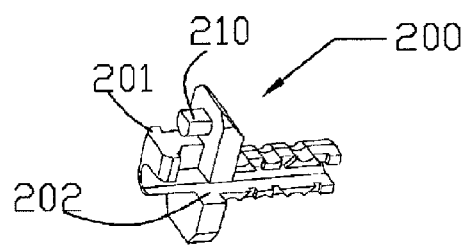
FIG. 7 is a schematic diagram showing the tailstock of the optical fiber plug according to the first embodiment of the invention.

Referring FIGS. 1, 5 and 7, in the present embodiment, the tailstock 200, which is provided with a buckle 201, is engaged on the base 100 which is provided with a buckling position 101 matching with the buckle 201. In order to connect the tailstock 200 and the base 100 conveniently, the tailstock 200 includes a positioning slot 202 and the base 100 includes a protrusive block 102 matching with the positioning slot 202. The optical cable 500 may be fixed in the tailstock by means of a thermo-shrinkable sleeve 600.

The inner structure of the optical fiber plug of the present invention has been described in details in conjunction with the drawings as above, and the operation of the optical fiber plug will be described below by referring to the drawings.

The optical fiber plug in a normal state is shown in FIG. 1. When the optical fiber plug is inserted into the optical fiber adapter, the protrusions 133 of the elastic buckling member 130 are stuck to the buckling position of the adapter. To pull out the optical fiber plug, the control rod 430 is pressed and thus the lateral rod 431 presses the elastic buckling member 130 downward, so that the optical fiber plug is released from the adapter; further, the latch member 411 of the ejecting rod 410 is separated from the barrier member 122, thus the ejecting rod 410 is ejected under the effect of the ejecting spring 420, and the ejecting rod 410 is stopped on the optical fiber adapter to move out the optical fiber plug from the adapter. The state in which the ejecting rod 410 is ejected is shown in FIG. 3. The reset of the ejecting assembly can be implemented by simply pushing the ejecting rod 410 back in the base 100.

Figure 8:
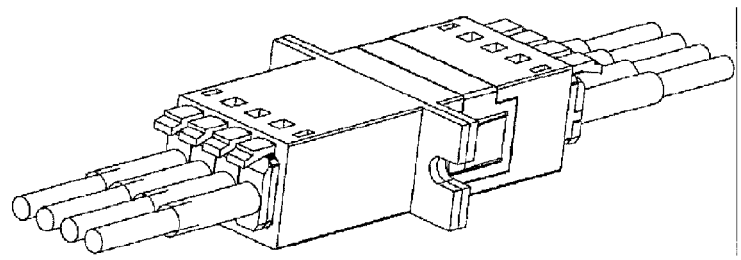
FIG. 8 is a schematic diagram showing the matching between a multi-socket adapter and the optical fiber plug according to the first embodiment of the invention.
Figure 9:
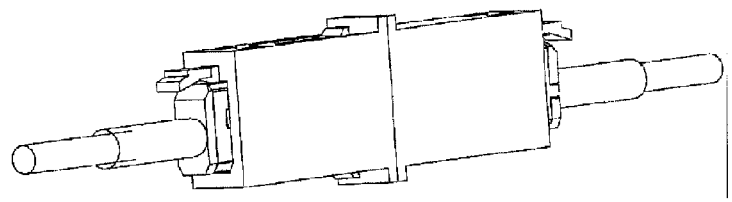
FIG. 9 is a schematic diagram showing the matching between a single-socket adapter and the optical fiber plug according to the first embodiment of the invention.

FIGS. 8 and 9 are schematic diagrams showing the matching of the optical fiber plug of the present invention and the optical fiber adapter, and the geometrical size of the inventive optical fiber plug is reduced, to achieve optical fiber connections of a higher density. For example, the mounting space of the optical fiber adapter as shown in FIG. 8 can receive at most two existing plugs originally, but can receive four optical fiber plugs of the present invention, so that the capacity of the optical fiber adapter is doubled without any change in the inner structure of the device, and the space for mounting the optical fiber adapter remains unchanged.

Figure 10:
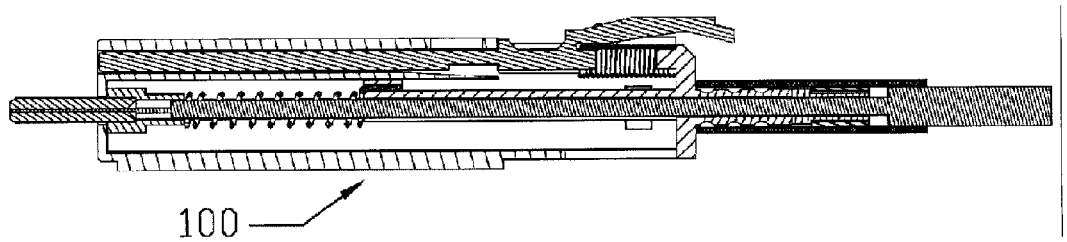
FIG. 10 is a sectional diagram of an optical fiber plug according to a second embodiment of the present invention.
Figure 11:
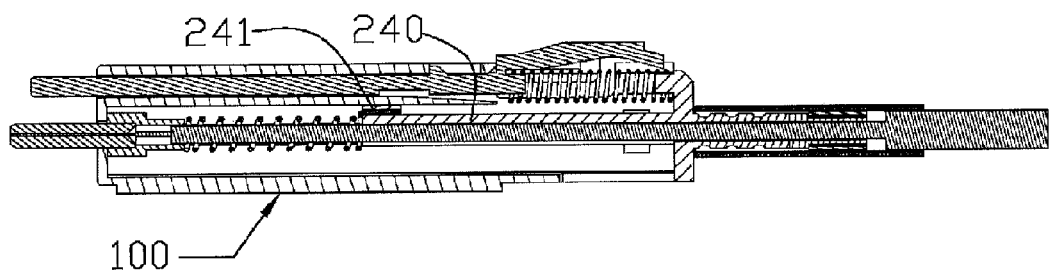
FIG. 11 is a schematic diagram showing the optical fiber plug with the ejected ejecting rod according to the second embodiment of the invention.
Figure 13:
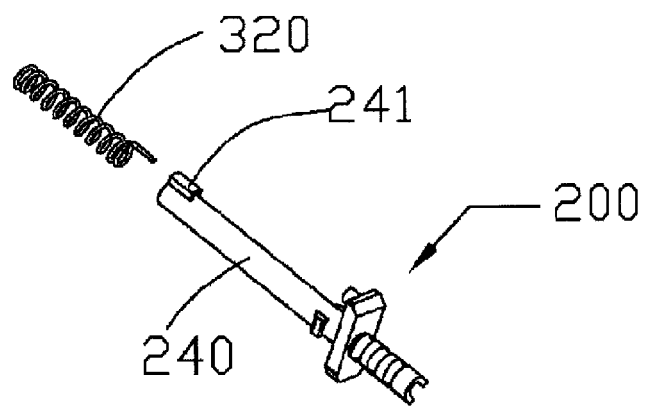
FIG. 13 is a schematic diagram of the tailstock of the optical fiber plug according to the second embodiment of the invention.

FIGS. 10 and 11 show the optical fiber plug according to the second embodiment of the present invention, in which a further improvement is made in the base of the first embodiment. The base 100 of the body in the second embodiment extends further in the longitudinal direction compared with that in the first embodiment, so that the lengths of both the first cavity 110 and the second cavity 120 are increased, which is advantageous in that the distance from the core receiver 310 to the tailstock 200 for fixing the optical fiber is increased, so that when the optical fiber plug is inserted into the adapter, a longer distance is available to eliminate the bending deformation of the optical fiber to prevent the performance of the optical fiber from being affected by its undersized bending radius when the core receiver 310 is moved backward due to a resistance. Referring to FIG. 13, in order to avoid the consequent extending of the core receiver adjusting spring 320 and save costs, the structure of the tailstock 200 is improved accordingly. In particular, an extending section 240 extends from the fore-end of the tailstock 200, a long slot along which the optical fiber 510 can extend forward is arranged in the extending section 240, and the fore-end of the extending section 240 forms a holding base 241 for the core receiver adjusting spring. Here, the holding base 241 is a boss in which a hole is provided for receiving a spring wire, and the spring wire at the end of the core receiver adjusting spring is bent to be inserted into the hole so as to implement the fixing of the core receiver adjusting spring 320 on the tailstock 200.

Figure 12:
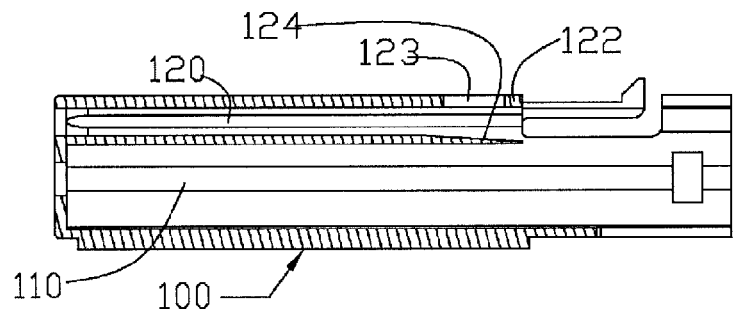
FIG. 12 is a sectional diagram of a base of the optical fiber plug according to the second embodiment of the invention.

Referring to FIG. 12, in the present embodiment, for the ease of mounting the ejecting rod 410, a portion in the bottom of the second cavity 120 that faces the positioning slide slot 123 and the barrier member 122 is shaped as a slope 124.

Other structures of the present embodiment are the same as those in the first embodiment, and the descriptions thereof are omitted.

The optical fiber plug of the present invention can be automatically ejected out of the optical fiber adapter when the elastic buckling member of the optical fiber plug is actuated, thus solving the problem of operational difficulties caused by the reduced geometrical size of the optical fiber plug, and realizing high density optical fiber connections with optical fiber jumpers.

The embodiments of the present invention are described as above in conjunction with the drawings. However, the present invention is not limited to above detailed embodiments which are only illustrative and not for limiting. Under the enlightenment of the present invention, those skilled in the art can make many variations, without departing from the purpose of the invention and the scope claimed in the appended claims, and all the variations shall fall into the scope of the invention.

The invention claimed is:

1. An optical fiber plug for high density optical fiber connections, which is used for matching with an optical fiber adapter, comprising: a body which is provided with an elastic buckling member adapted to buckle the optical fiber adapter, wherein the body is further provided with an ejecting assembly which is actuated at the same time when the elastic buckling member is actuated to release the body from the optical fiber adapter, the ejecting assembly comprises an ejecting spring and an ejecting rod that are arranged in the body and a control rod connected integrally with the ejecting rod, the control rod is slidable together with the ejecting rod relative to the body, and the ejecting rod is ejected out of the body when the ejecting assembly is actuated, and stopped on the optical fiber adapter to eject the body out of the optical fiber adapter.

2. The optical fiber plug for high density optical fiber connections of claim 1, wherein, the body comprises a base and a tailstock connected in the rear end of the base, the base contains a first cavity and a second cavity extending in parallel in a longitudinal direction of the base, and a first through-hole and a second through-hole respectively facing the first cavity and the second cavity are provided in a front end side of the base, the first cavity receives a core receiving assembly, a core receiver of which protrudes from the first through-hole, the second cavity receives the ejecting assembly, and the ejecting rod is ejected from the second through-hole when the ejecting assembly is actuated.

3. The optical fiber plug for high density optical fiber connections of claim 2, wherein, the elastic buckling member is located above the second cavity, and comprises two elastic cantilevers arranged in parallel, ends of which are provided with protrusions with slopes, the control rod is located between the two elastic cantilevers and comprises a lateral rod perpendicular to the longitudinal direction of the control rod and adapted to press on the elastic cantilevers, and when the control rod is pressed down, the elastic cantilevers are pressed down so that the elastic buckling member is released from the optical fiber adapter.

4. The optical fiber plug for high density optical fiber connections of claim 3, wherein, one end of the ejecting spring abuts against the tailstock, the other end of the ejecting spring abuts against the ejecting rod, a latch member is provided on the ejecting rod, and a barrier member and a positioning slide slot in front of the barrier member are arranged in the top wall of the second cavity; the latch member is adapted to be pressed against the barrier member, the ejecting spring is compressed between the ejecting rod and the tailstock, and when the control rod is pressed, the ejecting rod is moved downward to release the latch member from the barrier member, so that the ejecting rod is ejected forward under the effect of the ejecting spring, and the latch member slides into the positioning slide slot.

5. The optical fiber plug for high density optical fiber connections of claim 4, wherein, the side of the latch member that is opposite to the barrier member sticking the latch member forms a slope.

6. The optical fiber plug for high density optical fiber connections of claim 2, wherein, the core receiving assembly comprises a core receiver adjusting spring located between the core receiver and the tailstock, and the core receiver adjusting spring is arranged around an optical fiber introduced into the core receiver.

7. The optical fiber plug for high density optical fiber connections of claim 6, wherein, the tailstock, which is provided with a buckle, buckles the base which is provided with a buckling position matching with the buckle.

8. The optical fiber plug for high density optical fiber connections of claim 7, wherein, the tailstock is provided with an extending section extending forward from the fore-end of the tailstock, and a spring retainer for matching with the core receiver adjusting spring is arranged in a fore-end of the extending section.

9. The optical fiber plug for high density optical fiber connections of claim 3, wherein, the core receiving assembly comprises a core receiver adjusting spring located between the core receiver and the tailstock, and the core receiver adjusting spring is arranged around an optical fiber introduced into the core receiver.

10. The optical fiber plug for high density optical fiber connections of claim 9, wherein, the tailstock, which is provided with a buckle, buckles the base which is provided with a buckling position matching with the buckle.

11. The optical fiber plug for high density optical fiber connections of claim 10, wherein, the tailstock is provided with an extending section extending forward from the fore-end of the tailstock, and a spring retainer for matching with the core receiver adjusting spring is arranged in a fore-end of the extending section.

12. The optical fiber plug for high density optical fiber connections of claim 4, wherein, the core receiving assembly comprises a core receiver adjusting spring located between the core receiver and the tailstock, and the core receiver adjusting spring is arranged around an optical fiber introduced into the core receiver.

13. The optical fiber plug for high density optical fiber connections of claim 12, wherein, the tailstock, which is provided with a buckle, buckles the base which is provided with a buckling position matching with the buckle.

14. The optical fiber plug for high density optical fiber connections of claim 13, wherein, the tailstock is provided with an extending section extending forward from the fore-end of the tailstock, and a spring retainer for matching with the core receiver adjusting spring is arranged in a fore-end of the extending section.

15. The optical fiber plug for high density optical fiber connections of claim 5, wherein, the core receiving assembly comprises a core receiver adjusting spring located between the core receiver and the tailstock, and the core receiver adjusting spring is arranged around an optical fiber introduced into the core receiver.

16. The optical fiber plug for high density optical fiber connections of claim 15, wherein, the tailstock, which is provided with a buckle, buckles the base which is provided with a buckling position matching with the buckle.

17. The optical fiber plug for high density optical fiber connections of claim 16, wherein, the tailstock is provided with an extending section extending forward from the fore-end of the tailstock, and a spring retainer for matching with the core receiver adjusting spring is arranged in a fore-end of the extending section.

* * * * *